Jan. 11, 1927.
R. F. HALLIWELL
SHAFT PACKING
Filed July 26, 1922
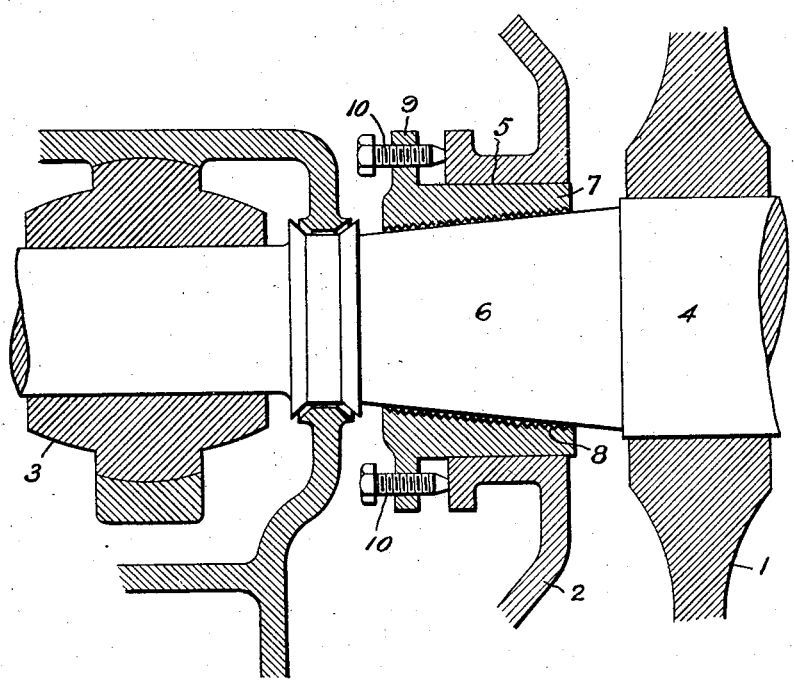
Inventor:
Reginald F. Halliwell;
by *Albert G. Davis*
His Attorney.

Patented Jan. 11, 1927.

1,614,120

UNITED STATES PATENT OFFICE.

REGINALD FRANCIS HALLIWELL, OF LEAMINGTON SPA, ENGLAND, ASSIGNOR TO GENERAL ELECTRIC COMPANY, A CORPORATION OF NEW YORK.

SHAFT PACKING.

Application filed July 26, 1922, Serial No. 577,795, and in Great Britain August 9, 1921.

The present invention relates to shaft packings and more particularly to packings of the labyrinth type such as are used in connection with machines such as steam turbines for preventing the escape of steam from or the ingress of air to the interior of the casing at the aperture through which the shaft passes through the casing. Labyrinth packings usually consist of a series of annular projecting teeth, ribs or fins on either or both the stationary and the rotating parts, the teeth or fins on the one part projecting into very close proximity with the other part, although not actually making contact therewith. These teeth or fins are usually made of small cross section so as to obtain the maximum packing effect in the shortest axial length and also reduce the risk of damage should the fins or teeth come in contact during operation, owing to expansion or contortion of the metal or vibration of the shaft.

The object of the present invention is to provide an improved packing of this type and particularly an improved arrangement for adjusting the packing so that wear may be taken up and the efficiency of the packing maintained.

For a consideration of what I believe to be novel and my invention, attention is directed to the accompanying description and the claims appended thereto.

In the drawing, the figure shows one form of the improved packing in section.

Referring to the drawing, the packing is shown in connection with the shaft of an elastic fluid turbine. 1 indicates a wheel of the turbine, 2 the casing, and 3 a bearing which supports the shaft 4. Shaft 4 passes through an aperture 5 in casing 2.

According to my invention, I provide the shaft 4 at the point where it passes through casing 2 with a tapered portion 6, and surrounding tapered portion 6 and suitably fixed in the aperture 5 in casing 2 is a longitudinally or axially adjustable internal tapered bushing 7. A plurality of projecting fins or teeth are provided on the shaft or the bushing or both, said fins or teeth projecting into close proximity to the surface of the other member. In the present instance, the inner surface of the bushing 7 is shown as being provided with teeth 8 which project into close proximity to the surface of the tapered portion 6. The bushing 7 is provided with a flange 9 having a number of threaded openings through which extend adjustable bolts 10 which at their ends engage a portion of casing 2. These bolts, together with such other suitable means as may be found desirable, support the bushing 7, in fixed position in the opening 5 in casing 2. If the projecting fins 8 should for any reason temporarily come into contact with the surface of the shaft, they will be quickly worn off. Now, when normal running conditions are restored, a considerable clearance will be left between the edges of the projections and the tapered portion of the shaft. This clearance, however, can be quickly and easily compensated for by moving the bushing 7 longitudinally along shaft 4 so it embraces a portion of the tapered shaft having a larger diameter. This adjustment can be made by means of screwing back the bolts 10 and forcing the bushing inwardly.

By my invention, therefore, it will be seen that in case for any reason the packing fins or teeth are worn away so that the clearance is impaired, it can be quickly and easily obtained again by adjusting the internally tapered bushing 7 along the tapered portion of the shaft.

In accordance with the provisions of the present statutes, I have described the principle of operation of my invention, together with the apparatus which I now consider to represent the best embodiment thereof; but I desire to have it understood that the apparatus shown is only illustrative, and that the invention may be carried out by other means.

What I claim as new and desire to secure by Letters Patent of the United States, is,—

1. In a shaft packing, the combination of a shaft member, a sleeve member which surrounds the shaft member, one of said members comprising an axially-extending tapered portion having a smooth surface, and annular packing teeth carried by the other member and extending radially into proximity to said smooth, tapered surface to pack against the same, whereby the radial packing clearance may be adjusted by moving said members axially relatively to each other.

2. In a shaft packing, a shaft having a smooth axially-extending tapered portion, a bushing surrounding such tapered portion, and annular packing teeth carried by said bushing and projecting radially toward the smooth, tapered shaft portion to pack against the same, whereby the radial packing clearance may be adjusted by moving the shaft and sleeve axially relatively to each other.

3. In a packing for elastic fluid turbines and the like, the combination of a shaft having an axially-extending tapered portion which presents a tapered surface, a member which surrounds said tapered portion and has a correspondingly tapered portion which presents a tapered surface, and projecting packing members carried by one of said portions and extending radially into proximity to the tapered surface of the other tapered portion so as to pack against such surface, and means permitting adjustment of said portions axially relatively to each other to vary the radial clearance.

In witness whereof, I have hereunto set my hand this thirtieth day of June, 1922.

REGINALD FRANCIS HALLIWELL.